United States Patent [19]

Muller

[11] Patent Number: 5,015,931
[45] Date of Patent: May 14, 1991

[54] WINDSHIELD WIPER SYSTEM WITH RAIN DETECTOR

[75] Inventor: Guy Muller, Bievres, France

[73] Assignee: Valeo Systemes D'Essuyage, Montigny-Le-Bretonneux, France

[21] Appl. No.: 535,651

[22] Filed: Jun. 11, 1990

[30] Foreign Application Priority Data

Jun. 12, 1989 [FR] France .................. 89 07715

[51] Int. Cl.$^5$ .................................. B60S 1/08
[52] U.S. Cl. .......................... 318/483; 318/480; 318/443; 318/DIG. 2
[58] Field of Search ......... 318/443, 444, 480, DIG. 2, 318/483; 15/250 C, 250.12, 250.13, 250.17

[56] References Cited

U.S. PATENT DOCUMENTS

| | | | |
|---|---|---|---|
| 4,355,271 | 10/1982 | Noack | 318/DIG. 2 X |
| 4,481,450 | 11/1984 | Watanabe et al. | 318/480 X |
| 4,859,867 | 8/1989 | Larson et al. | 318/480 X |
| 4,871,917 | 10/1989 | O'Farrell et al. | 15/250 C X |
| 4,916,374 | 4/1990 | Schierbeek et al. | 318/483 |

OTHER PUBLICATIONS

Patent Abstracts of Japan, vol. 9, No. 220, Sep. 6, 85, JP-A-60 78844.
Patent Abstracts of Japan, vol. 10, No. 22, Jan. 28, 86, JP-A-60 174931.

*Primary Examiner*—Bentsu Ro
*Attorney, Agent, or Firm*—Dennison, Meserole, Pollack & Scheiner

[57] ABSTRACT

In a windshield wiper system for vehicles, with which a rain detector is associated, the rain detector operates according to the principle of detection of the absorption by wet glass of light rays which are subjected to multiple total reflections within the windshield.

The detector comprises a plurality of non-directional light sources together with a plurality of sensors each of which receives the light from the various sources. The light sources are modulated at different frequencies, and the sensors are associated with demodulation circuits, such that more detailed and accurate information as to the nature of the reductions in transparency of the windshield is obtained. The windshield wiper system is then activated in the light of this detailed information.

6 Claims, 1 Drawing Sheet

WINDSHIELD WIPER SYSTEM WITH RAIN DETECTOR

FIELD OF THE INVENTION

This invention relates to windshield wiper systems for the windshields of vehicles.

An object of the invention is to provide a windshield wiper system with which there is associated a detector which enables to commence automatically when rain falls on the windshield, and/or, optionally, enabling a signal or a command for cleaning to be given when the windshield is dirty, whereby an operation is commenced consisting of wiping of the windshield together with the projection of a liquid on to the latter.

BACKGROUND OF THE INVENTION

A system has previously been proposed in which rain detectors or dirt detectors are used. These are detectors which sense the degree of transparency of the windshield: they take the form which is illustrated diagrammatically in FIG. 1 of the accompanying drawings, and will be best explained by reference to FIG. 1.

With reference to FIG. 1, therefore, a point light source 10, supplied through an emission circuit 12, illuminates the windshield 14 from the inner side of the latter. The light is transmitted into the windshield through an optical interface 16, which may be prismatic or lenticular, at an angle of incidence such that the light penetrates into the glass of the windshield and is then subjected to multiple total reflections within the thickness of the glass. An optical interface 18 is placed at a distance corresponding to a whole number of reflections of the light beam (FIG. 1 shows four such reflections). The optical interface 18, like the interface 16, may be prismatic or lenticular, and enables the beam to pass out of the windshield and to be directed towards a light sensor 20. This light sensor is coupled to a detection circuit 22, which processes the signal received from the sensor 20 and is arranged to transmit a starting signal to a power control circuit 24. The latter is the control circuit for a motor 26 which drives the windshield wipers of the system. The power control circuit is of course also arranged to be started or stopped by a manual control switch 28 which takes priority over the circuit 22.

When the windshield is clean and dry, the light from the source 10 is subject to multiple total internal reflection, with a very low attenuation taking place within the windshield. However, when it is wet or covered with snow or dirty, this light is absorbed or diffused at those points where perfect total reflection back towards the interior of the windshield ought to be taking place. In consequence, the light sensor 20 receives a reduced intensity of light as compared with that which it receives when the windshield is fully reflective. It is this difference in light intensity which is utilised by the detection circuit 22 in order to determine whether or not it is appropriate to commence a wiping operation.

One of the disadvantages of rain detectors as proposed up to the present time is the fact that they perform a detection of rain in a very limited linear zone of the windshield; the process is thus too coarse to identify nuances in the condition of the windshield. In this connection, it will be understood with reference to FIG. 1 that the rain detector will only supply a rain detection signal if the rain drops fall exactly on the points on the outer face of the windshield at which internal total reflection of the light ought to take place. For example, in FIG. 1 there is shown one rain drop 30 which has fallen on one of these points, while other rain drops 32 and 34 have fallen on other points where they have no influence at all on the detector. In addition, with this detector there is no way of discriminating between the natures of different effects which cause a variation in the intensity of incident light to take place, so that the detection circuit 22 is supplied with very little information on which to base a decision as to whether to leave the system in its active or inactive state, or alternatively whether for example to commence a wiping operation at low speed or high speed or intermittently, or to activate the windshield washer with three sweeps of the windshield wipers, and so on.

DISCUSSION OF THE INVENTION

The present invention aims to improve windshield wiper systems which employ detectors for detecting windshield transparency, by making these detectors able to provide data that is better controlled.

To this end, according to the invention it is proposed to place a plurality of frequency modulated light sources, and a plurality of light sensors, all in a common zone of the windshield, the system then comprising a detection circuit associated with each light sensor, and this circuit being adapted to demodulate each of the frequencies of the different sources and to supply a signal corresponding to each one of the demodulations.

As a rule, the distance between any one light source and any one light sensor corresponds to a whole number of total reflections of the light within the windshield. The distance between light source and sensor is to be understood in this context to mean the distance between the point of entry of the light rays emitted by the source into the windshield and the point of exit of these rays from the windshield towards the sensor.

This construction enables surface detection to be achieved, while more complete information is obtained as to the nature of the reduction in transparency of the windshield, for example in terms of the size and spacing of the rain drops. This information is much more comprehensive than would be the case is a single light sensor, or a plurality of independent, juxtaposed light sensors, were provided.

There will preferably be as many light sources as there are light sensors arranged for receiving the light rays emitted by these sources.

Futher features and advantages of the invention will appear from a reading of the detailed description which follows, which is given by way of example only and with reference to the accompanying drawings.

DESCRIPTION OF A PREFERRED EMBODIMENT OF THE INVENTION

Figure 1:
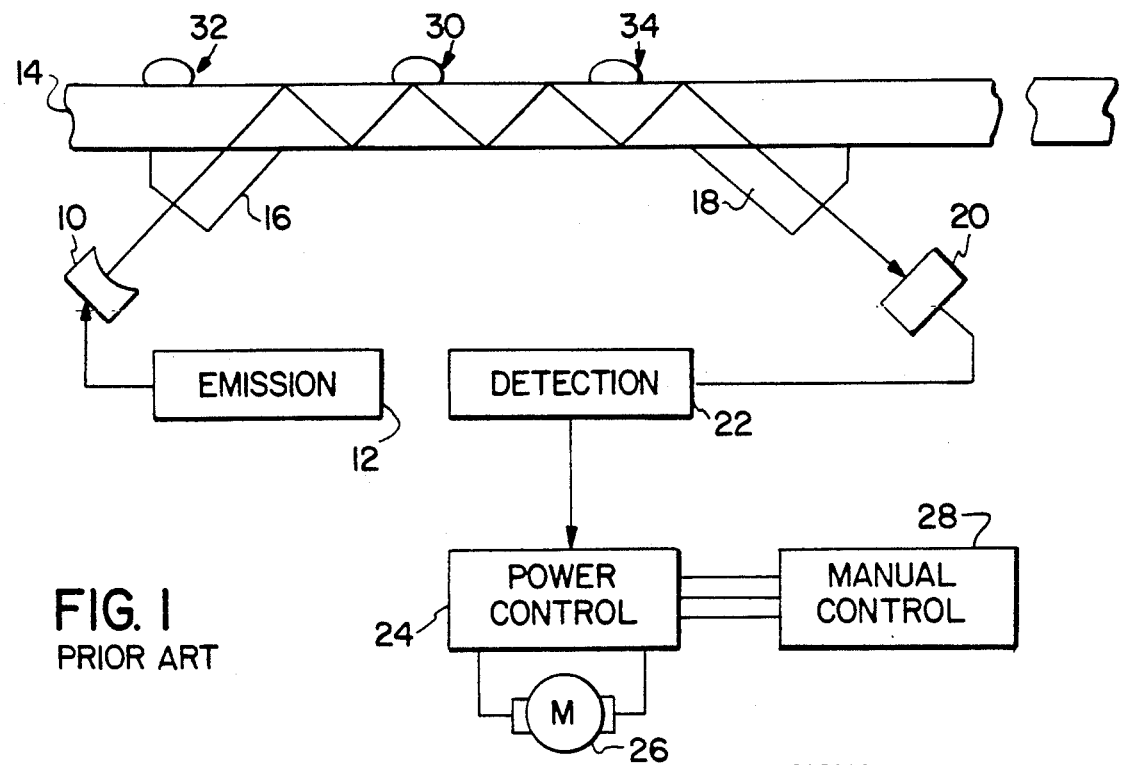
FIG. 1, representing the basic known principle enabling the presence of rain on the windshield to be detected, has already been described.
Figure 2:
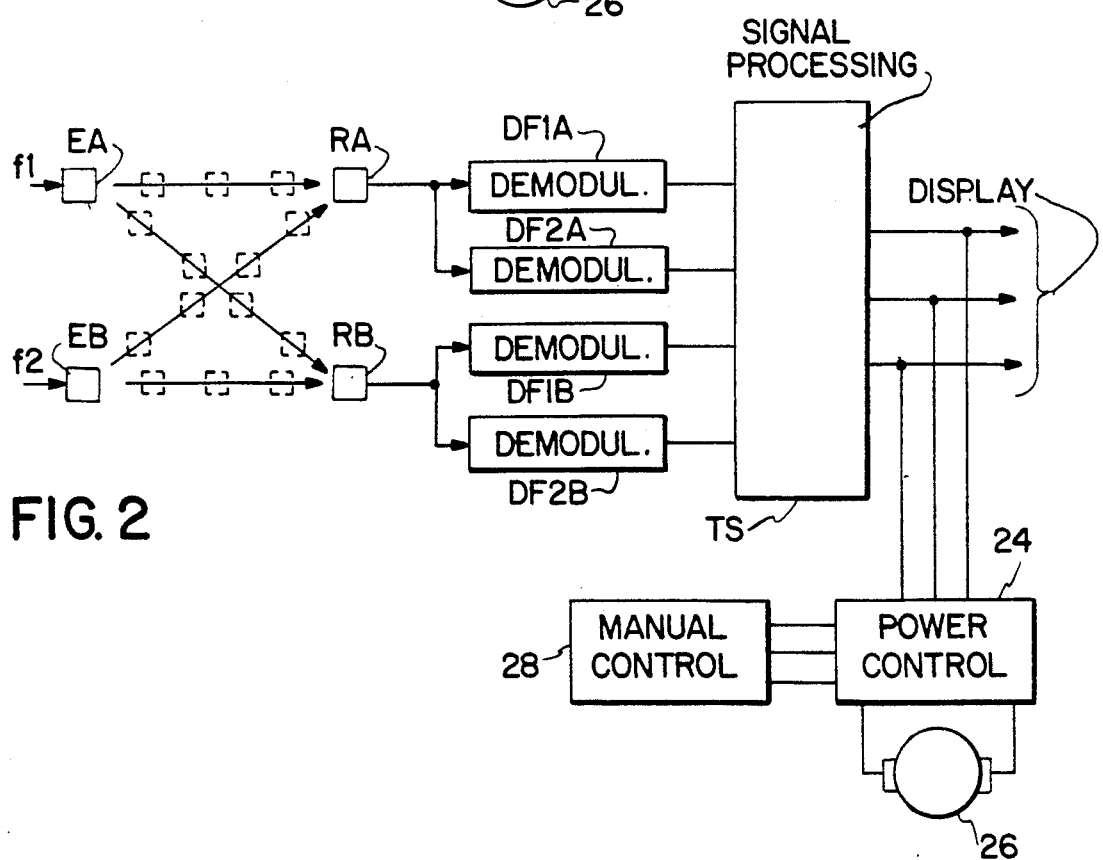
FIG. 2 is a schematic block diagram representing the arrangement of a windshield wiper system in a preferred enbodiment in accordance with the present invention.

Mechanically and optically, the invention employs the same principles as those which have already been described above in relation to FIG. 1. Accordingly these need not be described again. FIG. 2 shows in a simple form a diagrammatic plan view of a system in accordance with the invention, showing the different respective positions of the light sources, and more particularly the positions of the points of entry of the light rays into the windshield after passing through the lenticular or prismatic interface which is adhesively secured on the windshield. FIG. 2 also shows the different positions of the light sensors, and in particular the points of exit of the light rays towards these sensors.

With a view to simplification, only two sources of emission of light are shown in FIG. 2, at EA and EB, and two light sensors or receivers RA and RB. The invention is however applicable to a larger number of light sources and sensors. The points of entry of the light rays emitted from the source are shown in the form of squares bearing the reference letters of the corresponding light sources, EA and EB. Similarly, the exit points of the rays are shown in the form of squares identified by the reference letters RA and RB of corresponding light sensors.

The relative disposition of the source EA and the detector RA is so arranged that the latter is able to receive the light emitted from the source EA after this light has undergone several total reflections within the windshield. This will be expressed concisely herein by saying that the distance between the source EA and the sensor RA corresponds to a whole number of total reflections of the rays within the windshield.

Similarly also, the relative disposition of the source EB and the sensor RB corresponds to a whole number of reflections within the windshield. However, it is also provided that the diagonal distance between the source EA and the sensor RB, and the distance between the source EB and the sensor RA, also correspond to whole numbers of total reflections. In order to illustrate this arrangement, squares of broken lines in FIG. 2 represent the sites of total reflection of the rays on the outer face of the windshield.

In this way a form of construction is arrived at in which the rain detector occupies a rectangle which is defined by the positions of all the light sources and all the light sensors which are arranged to receive the light rays emitted by those sources. This rain detection rectangle is located in the zone of the windshield which is swept by the windshield wiper. It occupies a few square centimeters, or a few tens of square centimeters, so that it does not impair the vision of the driver of the vehicle.

The directionality of the light sources is preferably made low, so that they can transmit light rays towards all of the sensors in the rain detection zone. This leads to one of the advantages of the invention, namely that light sources which have low directionality are considerably cheaper than directional light sources.

The light source EA is preferably modulated to a first frequency f1 and the light source EB to a second frequency f2, but it is also possible to arrange that the light sources EA and EB are modulated at the same frequency.

Each of the sensors RA, RB is connected to a detection circuit which is capable of demodulating the frequencies from the diffeent light sources. Since there are, by way of example, in this embodiment, two sources and two frequencies, two demodulators are provided for each of the sensors. These comprise demodulators DF1A and DF2A for the first sensor RA, and demodulators DF1B and DF2B for the second sensor RB. It will be noted that the modulation and demodulation of the frequency enables ambient light to be eliminated. Ambient light is a component always present, but is not modulated at a frequency f1 or f2 of the light signal detected by the sensors RA and RB.

The signals detected by the four demodulators are applied to a data processing circuit TS, which acts in an analogue and/or digital manner and which generates control signals in response to the signals which it receives. These control signals are for control of the windshield wiper motor control circuit, and are also, optionally, adapted to be displayed on the fascia panel of the vehicle.

The signal processing operation is a simple matter, consisting essentially of a comparison between the levels of received signals with different threshold values, followed by logical processing of the results of these comparisons via logic gates of the AND, OR, NAND and NOR types. The actual details of the processing depend on the particular application envisaged for the system and the conditions of installation for the system. However, it is important to note that more information is obtained with this system than could be obtained with a single combination of one light source and one light sensor or with several independent such combinations.

If FIG. 2 is taken as an example, it can be seen that the sites of total reflection of the light rays in the windshield are quite numerous, and that consequently the probability that rain drops, falling on the glass, will be detected are high, whether the drops are small and uniformly distributed, as is the case in light, fine rain, or whether they are large and irregularly spaced. However, the system also allows a distinction to be made between fine rain and heavy rain with large rain drops. In the former case, the sensors RA, RB have every opportunity to sense attenuation of light coming from each one of the sources EA, EB, while in the second case certain light paths will be affected by a rain drop while others will not. Modulation at different frequencies allows the distinction between several light paths terminating at a given light sensor to be made. Irregularity in the attenuations of the various light signals will be detected by the processing circuits TS, to provide data which can then be used to control the wiper motor or other fittings such as the windshield washer pump.

It will for example readily be deduced that detection of large, irregularly distributed, rain drops can be used to trigger high speed wiping, while fine rain drops, uniformly distributed, can be made to result in low speed wiping.

It is thus possible to choose several wiping speeds, or several cycle times for intermittent wiping, according to the data carried by the system, and in particular information as to the distribution of variations in transparency. This information was not obtainable with prior art systems.

In accordance with another feature of the invention, detection is made more sensitive by also using a measurement of the force exerted by the windshield wiper motor, so as to differentiate between a dirty windshield and a windshield which has been wetted by rain. Thus if wiping is commenced in response to the detection of a reduction in transparency of the windshield, it is possible that this reduction in transparency will in fact be due to dirt (mud etc.). In this case wiping will take place on a dry glass and the motor will therefore demand a high energy input. This high energy demand can be detected in terms of the motor current or torque. Used in association with the measurement of transparency, the measurement of motor torque will for example be used to initiate washing of the windshield at the same time as wiping.

What is claimed is:

1. A windshield wiper system for a vehicle, comprising a windshield transparency detector which include a plurality of sources of frequency modulated light and a plurality of sensors for said light, said sources and sensors being arranged in a two dimensional array on a common zone of the windshield, each source radiating nondirectional light to propagate in said windshield to impinge upon each of said sensors, the system further comprising a demodulation circuit associated with each said light sensor for demodulating each of the frequencies of the light from said sources and for providing a signal corresponding to each demodulation.

2. A windshield wiper system according to claim 1, wherein the light sources are adapted to emit light modulated at a different frequency from each other.

3. A windshield wiper system according to claim 1, wherein said sources and sensors are located in said zone of the windshield in positions such that the distance between any source and any said sensor corresponds to a whole number of total reflections of the light within the windshield.

4. A system according to claim 1, wherein the number of sources is the same as the number of sensors.

5. A system according to claim 1, further comprising a processing circuit for processing signals output from the demodulation circuits and being adapted to produce in response thereto windshield wiper control signals as a function of the respective signal levels detected by the sensors at the modulation frequencies.

6. A system according to claim 1, further comprising means for giving a control signal as a function of signals output from the demodulation circuits together with the current consumed by the wiper motor.

* * * * *